US009065725B1

(12) United States Patent
Nanda et al.

(10) Patent No.: US 9,065,725 B1
(45) Date of Patent: Jun. 23, 2015

(54) TECHNIQUES FOR VIRTUAL ENVIRONMENT-BASED WEB CLIENT MANAGEMENT

(75) Inventors: Susanta Kumar Nanda, Los Angeles, CA (US); Tzi-cker Chiueh, Setauket, NY (US)

(73) Assignee: Symantec Corporation, Mountain View, CA (US)

( * ) Notice: Subject to any disclaimer, the term of this patent is extended or adjusted under 35 U.S.C. 154(b) by 822 days.

(21) Appl. No.: 12/881,800

(22) Filed: Sep. 14, 2010

(51) Int. Cl.
   *G06F 15/173* (2006.01)
   *H04L 12/26* (2006.01)
   *H04L 29/08* (2006.01)

(52) U.S. Cl.
   CPC .............. *H04L 43/04* (2013.01); *H04L 67/22* (2013.01); *H04L 67/142* (2013.01); *H04L 67/02* (2013.01)

(58) Field of Classification Search
   CPC ......... H04L 43/04; H04L 67/22; H04L 67/02; H04L 67/142
   See application file for complete search history.

(56) References Cited

U.S. PATENT DOCUMENTS

| | | | |
|---|---|---|---|
| 2005/0149726 A1* | 7/2005 | Joshi et al. | 713/164 |
| 2005/0223220 A1* | 10/2005 | Campbell et al. | 713/164 |
| 2007/0056020 A1* | 3/2007 | Ward | 726/3 |
| 2007/0240225 A1* | 10/2007 | Shrader et al. | 709/224 |
| 2011/0023114 A1* | 1/2011 | Diab et al. | 709/224 |

OTHER PUBLICATIONS

Guest Contributor, "Get It Done: Start and stop applications automatically using Solaris scripts", Tech Republic, http://www.techrepublic.com/article/get-it-done-start-and-stop-applications-automatically-using-solaris-scripts/5034999, Published on Jun. 18, 2003, Accessed on Mar. 19, 2013.*

Susanta Nanda, "VIBES: Virtualization-based End-point Security Solution," Core Research Group, Symantec Research Labs; Apr. 2008; 12 pages.

Information Sheet; VentureBeatProfiles; GreenBorder Technologies Overview; VentureBeat 2007; 3 pages; found at: http://venturebeatprofiles.com/company/profile/greenborder-technologies.

(Continued)

*Primary Examiner* — Patrice Winder
*Assistant Examiner* — Nam Tran
(74) *Attorney, Agent, or Firm* — Wilmer Cutler Pickering Hale and Dorr LLP (57) ABSTRACT

Techniques for virtual environment-based web client management are disclosed. In one particular exemplary embodiment, the techniques may be realized as a method for virtual environment-based web client management comprising monitoring web requests of a first web client of a first virtual machine, detecting a web request from the first web client matching one or more indicators, the one or more indicators corresponding to content to be handled on a second virtual machine, capturing a state of the first web client on the first virtual machine, transferring captured state information and web request information to a second web client on the second virtual machine, transitioning a user interface from the first web client to the second web client automatically using at least one of a keyboard controller driver and a hypervisor API, the second web client handling the web request from the first web client.

20 Claims, 5 Drawing Sheets

(56) References Cited

OTHER PUBLICATIONS

Information Sheet; ZoneAlarm by Check Point; ZoneAlarm ForceField; Check Point Software Technologies Ltd. 2007; 2 pages; found at: http://download.zonealarm.com/bin/free/beta/forcefield/index.html.

Information Sheet; Sandboxie—Sandbox software for application isolation and secure Web browsing; Sandboxie 2010; 5 pages; found at: http://www.sandboxie.com.

* cited by examiner

TECHNIQUES FOR VIRTUAL ENVIRONMENT-BASED WEB CLIENT MANAGEMENT

FIELD OF THE DISCLOSURE

The present disclosure relates generally to web client management technologies and, more particularly, to techniques for virtual environment-based web client management.

BACKGROUND OF THE DISCLOSURE

Malware, which is capable of stealing credentials and other sensitive information, is widespread. Such malware may be capable of compromising a virtual machine and/or physical machines. Such malware compromised virtual machines and/or physical machines may be capable of capturing information even though a user is using a supposedly secure HTTPS session.

In view of the foregoing, it may be understood that there may be significant problems and shortcomings associated with current virtual environment-based web client management technologies.

SUMMARY OF THE DISCLOSURE

Techniques for virtual environment-based web client management are disclosed. In one particular exemplary embodiment, the techniques may be realized as a method for virtual environment-based web client management comprising monitoring web requests of a first web client of a first virtual machine, detecting a web request from the first web client matching one or more indicators, the one or more indicators corresponding to content to be handled on a second virtual machine, capturing a state of the first web client on the first virtual machine, transferring captured state information and web request information to a second web client on the second virtual machine, transitioning a user interface from the first web client to the second web client automatically using at least one of a keyboard controller driver and a hypervisor API, the second web client handling the web request from the first web client.

In accordance with other aspects of this particular exemplary embodiment, capturing a state of the first web client on the first virtual machine may comprise using an API of the first web client to capture state information.

In accordance with further aspects of this particular exemplary embodiment, using an API of the first web client may comprise using at least one of a browser helper-object and a browser plug-in.

In accordance with additional aspects of this particular exemplary embodiment, capturing a state of the first web client on the first virtual machine may comprise using a proxy server to capture a state of the first web client.

In accordance with additional aspects of this particular exemplary embodiment, the one or more indicators corresponding to content to be handled on a second virtual machine may comprise indicators of a secure HTTPS transaction.

In accordance with additional aspects of this particular exemplary embodiment, the one or more indicators may comprise at least one of: a URL beginning with HTTPS; and traffic destined for port 443.

In accordance with additional aspects of this particular exemplary embodiment, the second virtual machine may comprise a secure virtual machine.

In accordance with additional aspects of this particular exemplary embodiment, the API of the first web client may allow capture of HTTPS transaction information for transitioning to a secure virtual machine.

In accordance with additional aspects of this particular exemplary embodiment, the one or more indicators corresponding to content to be handled on a second virtual machine may comprise indicators of a request to execute unknown content, a request for content from an unapproved domain; and a request for content from a questionable domain.

In accordance with additional aspects of this particular exemplary embodiment, the second virtual machine may comprise a virtual machine for testing unapproved content.

In accordance with additional aspects of this particular exemplary embodiment, transferring captured state information and web request information to a second web client on a second virtual machine may comprise at least one of a cookie and a request header.

In accordance with additional aspects of this particular exemplary embodiment, a browser helper object may be used to rewrite a request from the second web client using the transferred captured state information.

In accordance with additional aspects of this particular exemplary embodiment, a script in the second virtual machine may be used to instantiate the second web client.

In accordance with additional aspects of this particular exemplary embodiment, at least a portion of state information may be used by the first web client is stored in electronic storage accessible to the second web client reducing a need to transfer state information.

In accordance with additional aspects of this particular exemplary embodiment, transitioning a user interface from the first web client to the second web client automatically using at least one of a keyboard controller driver and a hypervisor API, may comprise switching a user interface in a manner such that the second web client is presented in a manner similar to the first web client such that a transition to the second web client handling the web request from the first web client does not disrupt a user of the first web client and the second web client.

In accordance with additional aspects of this particular exemplary embodiment, an indicator may be received indicating the end of a secure transaction.

In accordance with additional aspects of this particular exemplary embodiment, the indicator of the end of the secure transaction may comprise at least one of: receipt of a packet sent to port 80 and content starting with a plaintext HTTP meeting a HTTP protocol specification.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the techniques.

In another particular exemplary embodiment, the techniques may be realized as an article of manufacture for virtual machine web management. The article of manufacture may comprise at least one non-transitory processor readable medium, and instructions stored on the at least one medium, wherein the instructions are configured to be readable from the at least one medium by at least one processor. The instructions may thereby cause the at least one processor to operate so as to monitor web requests of a first web client of a first virtual machine, detect a web request from the first web client matching one or more indicators, the one or more indicators corresponding to content to be handled on a second virtual machine, capture a state of the first web client on the first virtual machine, transfer captured state information and web request information to a second web client on the second virtual machine, and transition a user interface from the first web client to the second web client automatically using at least one of a keyboard controller driver and a hypervisor API, the second web client handling the web request from the first web client.

In yet another particular exemplary embodiment, the techniques may be realized as a system for virtual environment-based web client management comprising one or more processors communicatively coupled to a network, wherein the one or more processors are configured to monitor web requests of a first web client of a first virtual machine, detect a web request from the first web client matching one or more indicators, the one or more indicators corresponding to content to be handled on a second virtual machine, capture a state of the first web client on the first virtual machine, transfer captured state information and web request information to a second web client on the second virtual machine, and transition a user interface from the first web client to the second web client automatically using at least one of a keyboard controller driver and a hypervisor API, the second web client handling the web request from the first web client.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
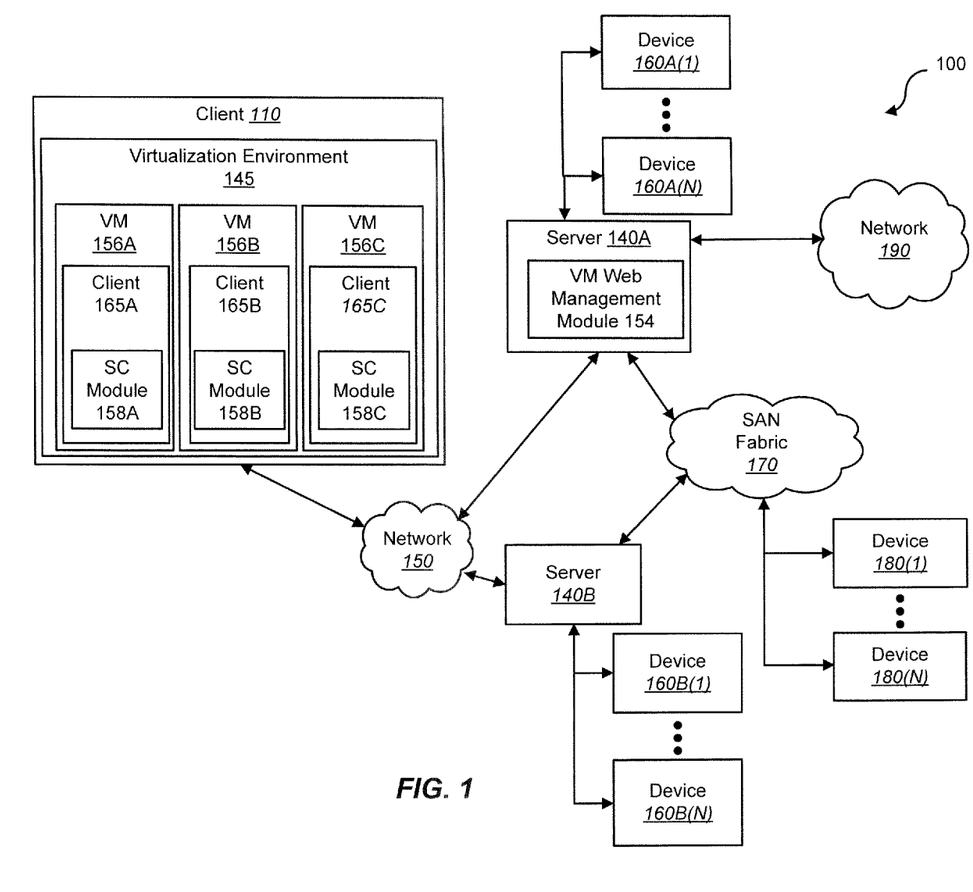
FIG. 1 shows a block diagram depicting a network architecture containing a platform for virtual environment-based web client management in accordance with an embodiment of the present disclosure.

FIG. 1 shows a block diagram depicting a network architecture 100 for virtual environment-based web client management in accordance with an embodiment of the present disclosure. FIG. 1 is a simplified view of network architecture 100, which may include additional elements that are not depicted. Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140B may be communicatively coupled to storage devices 160B(1)-(N).

The description below describes network elements, computers, and/or components of a system and method for virtual environment-based web client management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Client 110 may be a platform hosting a virtualization environment 145. Virtualization environment 145 may be capable of supporting one or more virtual machines such as, for example, virtual machines 156A-156C. According to some embodiments, virtualization environment 145 may be a hypervisor or a Virtual Machine Manager (VMM).

Virtualization may occur at different levels of abstraction. According to some embodiments, virtual machines 156A-156C may abstract at a hardware level and may sit on top of an operating system (e.g., VMware workstation and Microsoft Virtual PC/Server). According to other embodiments, virtual machines 156A-156C may abstract at a hardware level and may not be on top of an operating system (i.e., they may be bare-metal implementations). Virtual machines 156A-156C may also, according to some embodiments, abstract at other levels including, but not limited to, Operating System (OS) level, OS system call level, instruction set emulation, application-binary interface emulation, user-level OS emulation, etc.

Virtual machines 156A-156C may contain clients 165A-165C, respectively. Clients 165A-165C may be web clients such as, for example, web browsers. Clients 165A-165C may contain SC Modules 158A-158C respectively. According to some embodiments, SC Modules 158A-158C may be state capture modules capable of capturing state information of clients 165A-165C. SC modules 158A-158C may use an API or interface of clients 165A-165C. For example, SC modules 158A-158C may be plug-ins, browser helper objects (BHOs) or other web client modules. State information captured by clients 165A-165C may include cookies, HTTP body content, HTTP header content, URL information, URI information, and other data accessible via the client. According to some embodiments, SC modules 158A-158C may obtain state information associated with a HTTPS request that may be otherwise inaccessible outside of an encrypted session (e.g., it may be encrypted and values may not be accessible at a gateway or a proxy server, but a BHO or plug-in to a web client may have access to state information). According to some embodiments, SC modules 158A-158C may not be used (e.g., state information may be captured on HTTP transactions using VM Web Management Module 154 of server 140A).

Servers 140A and 140B may contain a management module (e.g., VM Web Management Module 154). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190. According to some embodiments, server 140A may be a proxy server, a gateway, a router, or another network device capable of routing and/or monitoring network traffic. For example, server 140A may be a proxy server or a gateway for virtual machines 156 to network 190 (e.g., the Internet). Servers 140A and 140B may capture information about one or more network requests and may store state information (e.g., in a database and/or on devices 160A and/or 160B). Server 140A may use VM Web Management Module 154 to monitor one or more requests of VMs 156A-156C as discussed in greater detail below.

Figure 2:
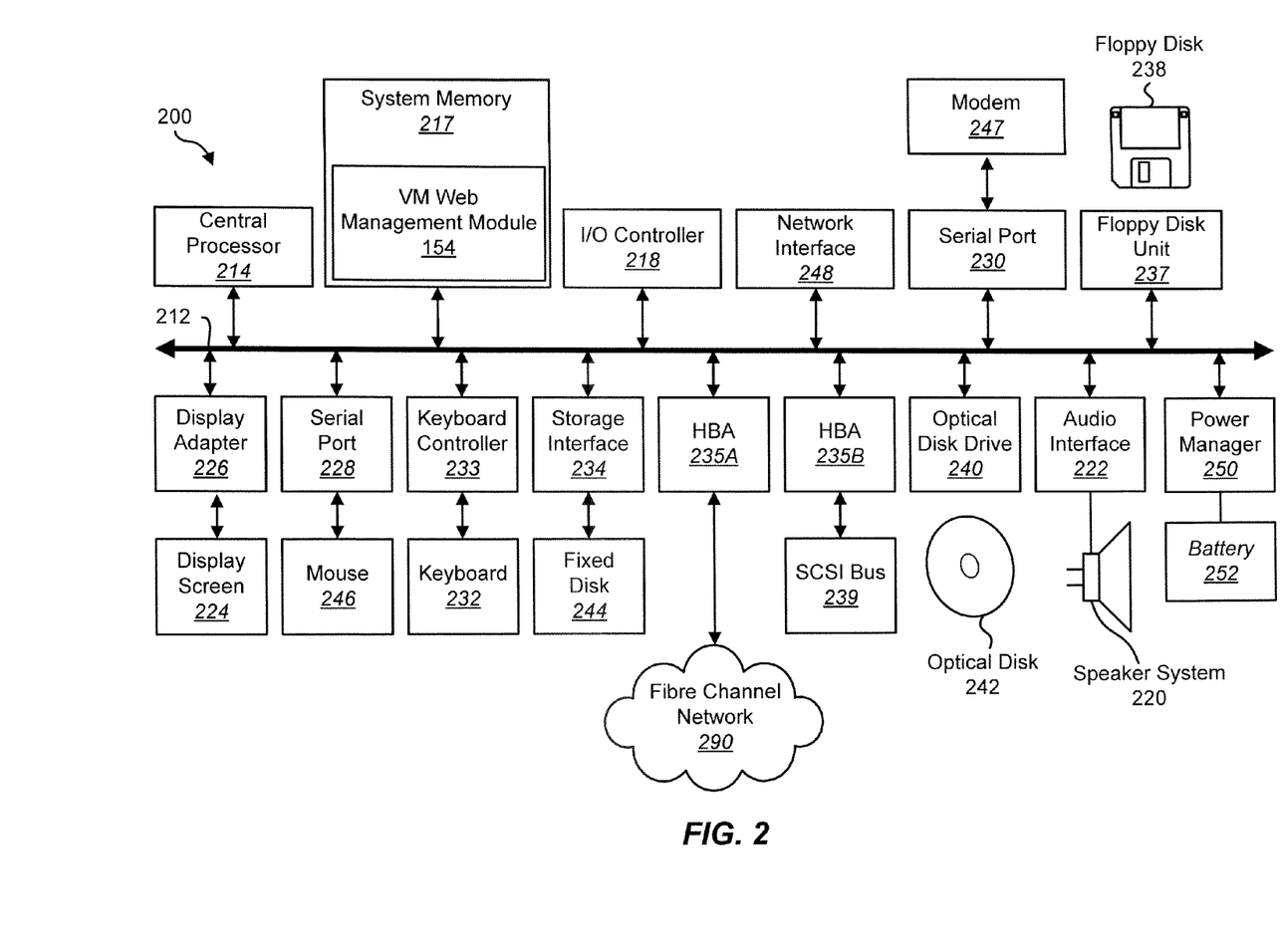
FIG. 2 depicts a block diagram of a computer system in accordance with an embodiment of the present disclosure.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

According to some embodiments, client 110 may be a mobile client such as, for example, a smart phone. Virtualization and transitions between virtual environments may occur on a server side platform and client 110 may receive data for a display according to a current virtual environment.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) being browsed. For example, it may be desirable to browse questionable domains in a locked down virtual environment that may permit no changes. Such a locked down virtual environment may be periodically rolled back to a known good state. It may also enhance security to browse financial or other sites where sensitive information is transmitted in a VM that is used only for this purpose. This may reduce a chance of malware infecting the VM environment which may intercept these sensitive financial communications. VM Web Management Module 154 may provide mechanisms by which browsing in different virtual environments can be done in a way that may be seamless and transparent to the user.

Although, the description below may be in reference to switching between two web clients (e.g., browsers) on two virtual machines, it should be understood that the techniques discussed herein may be used to transition between any number of web clients and VMs. Furthermore, the web clients and/or virtual machines may be located local to or remote from one another.

According to some embodiments, VM Web Management Module 154 may use a web proxy server (e.g., squid), in transparent mode between two or more virtual machines and the web servers. The web proxy server may intercept network traffic between web for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

According to some embodiments, VM Web Management Module 154 may provide seamless transitioning between multiple web clients running on different virtual machines. The transition may maintain the appearance of a single browsing session to a user and/or to a web site. This may be performed without requiring modification to a web client or a web server. This may improve security for a user while minimizing disruption of a transition. VM Web Management Module 154 may allow browsing to take place in different security contexts depending on properties of a connection (e.g., HTTP or HTTPS) or domain without interfering with a normal user experience of browsing and without interruption.

According to some embodiments, VM Web Management Module 154 may use one or more heuristics and/or URL rating services (e.g., Norton Safe Web) that may provide an estimate of the security and sensitivity of a web transaction. Security may be improved if browsing took place in a VM that was appropriate for domains clients and web servers without any configuration changes to the browser or to server-side software. Since HTTPS traffic may not be analyzed, such packets may be tunneled through the proxy server. Once such a proxy server is set up and given a switching point (e.g., a detected indicator that a change in a security-level is taking place), VM Web Management Module 154 may then implemented as an extension to the proxy server. According to some embodiments, a browser extension (e.g. BHO in IE or add-on in Firefox) may be used.

Because HTTP is a stateless protocol, any session-related states may be maintained, either directly or indirectly, by transferring them or their references during the request/response packet sequences. Examples of such states may include keys to database records maintaining the states at the server side, names of the cookies at the client-side that store session-related data, and hidden variables.

According to some embodiments, web clients (e.g., client-side browsers) may not maintain session-related states except cookies, which may be set explicitly by server-side software. These cookie settings may come through request headers, which may be analyzed during packet inspection (e.g., by a web proxy server or a gateway). Although some session state information may be set using active content (e.g., JavaScript) supplied as part of the response page, a last request sent by a web client may be more useful to monitor according to some embodiments (e.g., when switching security levels, such as from HTTP to HTTPS connections). Web requests may not contain active content.

According to some embodiments, VM Web Management Module 154 may be a module on server 140A, which may be a proxy server or a gateway. VM 156A may be a virtual machine used for regular or most web and HTTP communications. VM 156B may be a virtual machine used for secure (e.g., HTTPS) transactions. VM 156C may be a virtual machine used for questionable or unknown content (e.g., unrecognized executable content).

VM Web Management Module 154 may capture information used for a web transaction by looking into the last request from a client 165A. For example, client 165A may be requesting data from an online merchant site. Communications not requiring security may continue on client 165A (e.g., browsing an online merchant site). When security is desired (e.g., an HTTPS transaction is initiated in response to a checkout button clicked) the techniques may be used to switch to a secure VM such as client 165B (e.g., periodically rolled back to a known good state, using binary white-listing, and containing security modules). A last request may then be dropped by VM Web Management Module 154 since all of the data may have been captured at a gateway or proxy server such as server 140A. Web Management Module 154 may initiate an artificial request containing all the captured information that may be created and sent from a secure VM web client such as, for example, client 165B. According to some embodiments, a module, a script, or an API on VM 156B may be used to instantiate client 156B and to initiate an artificial request.

According to some embodiments, VM Web Management Module 154 may intercept all the requests and responses from clients 165A-C while they pass through the server 140A. In at least one embodiment, modifications of any necessary header data (e.g., choosing among a set of supported encodings) may be made to facilitate greater control over the content. VM Web Management Module 154 may look into the contents of a last request, (e.g., a first request after a detection of indicators of a secure transaction or unknown content), from client 165A and extract session-relevant information including HTTP request body content, cookie values sent in a header, the complete URL, etc.

A display of client 110 may be transitioned from an interface of client 165A to show an interface of client 165B. According to some embodiments, an API of virtualization environment 145 may be used to switch or transition a display.

For example, a window for a first virtual machine client may be open during non-secure communications. It may be maximized and/or its size and position may be known. When a transition is made to a secure virtual machine, an interface window for the secure virtual machine may be placed on top in the same size and position and containing the same interface attributes (e.g., the underlying virtual machines may be a same OS and/or other attributes but may be configured differently for security purposes). The overlaid interface window to the secure virtual machine may contain a web client window which may be similar to a web client window open in the non-secure virtual machine (e.g., a same browser make but perhaps with more secure settings and/or security add-ons) and may contain other similar characteristics. For example, the browser window may be opened to a same size and position in the secure virtual machine interface window as the browser window in the non-secure virtual machine interface window. Differences may be focused on security aspects and may not be noticeable to a user. A destination web client may open a URL captured when a secure transaction or unknown content was detected (e.g., opened using a script in the VM running the destination browser, for example, a script on client 165B).

According to at least one embodiment, a keyboard controller driver may be used to transition between virtual machine interfaces. This may not require a user to do anything, and may occur without a user's knowledge or control (e.g., the transition may occur so quickly that a user may not be able to perceive the switch and a user may not be provided control over which interface window is displayed). Virtual machine monitors (VMMs), hypervisors, and/or virtualization platforms may expose multiple ways, such as keyboard shortcuts, menu tabs, and mouse clicks, that may allow a user to switch displays and the keyboard/mouse focus between two or more virtual machines. According to some embodiments, transitioning between virtual machines may be implemented by installing a keyboard filter driver on a host OS (e.g., an OS of client 110) so that the host OS can intercept these special key combinations when a VMM is in focus (e.g., has charge of the processor). Artificial keystrokes may be inserted in the software (keyboard controller driver) to switch focus from one VM to the other VM. A similar mechanism may be used to implement VM switching for different VMMs.

According to some embodiments, a user interface on client 110 may present a single window or other unified interface that presents contents from multiple clients and/or virtual machines. For example, a single window may contain a browser that uses tabs, frames, or other methods to provide content from multiple clients and/or virtual machines. In these embodiments, transitioning a display may involve switching a tab, changing focus, scrolling, or other methods to present a current client and/or virtual machine interface appropriate for a detected security level. Transitions between displays of virtual environments may be transparent and/or non-disruptive to a user. Such transitions may use APIs or interfaces of a VMM, a hypervisor, a virtualization platform, or an underlying OS system call.

According to some embodiments, VM Web Management Module 154 may intercept the request generated by client 165B and may modify it by inserting one or more portions of relevant information captured in the previous request from client 165A. VM Web Management Module 154 may send the modified request from client 165B to a destination server (e.g., a web server accessible via network 190). VM Web Management Module 154 may route the replies for this new sub-session to the client 165B.

VM Web Management Module 154 may monitor for additional transitions or switching points. For example, VM Web Management Module 154 may detect a resumption of HTTP communication that may indicate a resumption of normal web browsing after a secure HTTPS based transaction is complete. VM Web Management Module 154 may detect a use of HTTP, a packet received on port 80 or another port configured for HTTP (instead of HTTPS default port 443), or other indicators (e.g., content starting with plaintext HTTP meeting a HTTP protocol specification). VM Web Management Module 154 may instantiate client 165A (if necessary), transition a user interface to that of client 165A (e.g., using a hypervisor API or a keyboard filter driver), and reroute the server responses back to client 165A. According to some embodiments, state information may be updated or set in client 165A. According to some embodiments, state information in client 165A may not be set or updated to prevent disclosing state information from secure client 165B to non-secure client 165A.

According to some embodiments, other modules and/or tools may be used to facilitate virtual machine web management. For example, if a request from client 165B is encrypted, intercepting and modifying it may be difficult. For plaintext HTTP messages, it may be easy to look into and modify a request in a proxy server. However, for HTTPS requests, browser helper objects, browser extensions, add-ons, and/or browser APIs may be used to intercept and/or modify encrypted requests. Browser helper objects, browser extensions, add-ons, and/or browser APIs may be able to see a plaintext version of encrypted messages in the browser's context (e.g., in the browser memory without encryption).

According to some embodiments, VM Web Management Module 154 may not be used and the entire request/response interception may be implemented within browser helper objects, browser extensions, add-ons, and/or browser APIs which may directly communicate with each other (e.g., from SC module 158A to SC module 158B). However, this method may use a browser instance already open in the other VM and may also leave the system vulnerable to attack from malware if a system is not tightly controlled.

According to at least one embodiment, state information of a browser may be stored in electronic storage accessible to a second virtual machine. For example, for transparent session switching, a cookie database may be shared between multiple browsers, either by mounting the same hard drive partition in their respective VMs or something similar. This would render the cookie exchange between the two browsers unnecessary. However, there may still be data (e.g., a request body and URL) that may be exchanged in order for the session to work seamlessly.

In addition to transitioning between virtual environments due to the detection of a secure transaction, transitions between virtual environments may also be implemented for other purposes (e.g., multiple levels of security, compartmentalizing security among groups, detection of unknown content, compartmentalizing security among users, etc.).

The detection of a web request matching one or more indicators of content to be handled on a second virtual machine and the URL rewriting to address such a transition is now described in further detail. Detecting sensitive web transactions in a web session may require the ability to look into all the request/response bytes that are sent/received by a web browser. In order to keep a browser unmodified (e.g., platform independent) a transparent web proxy server may be used (e.g. squid) that may logically sit between client browsers and web servers (e.g., server 140A). According to some embodiments, the proxy server may be deployed on the same physical machine if the browser is hosted within a virtual machine or a physical machine with multiple Network Interface Cards (NICs), or a different physical machine within the LAN, and may require modifications to a routing table and/or gateway.

On receiving an HTTP request (e.g., a request sent to a port configured for HTTP transactions or content starting with a plaintext HTTP meeting a HTTP protocol specification) VM Web Management Module 154 may examine request headers and may make necessary modifications such that it can understand a corresponding response. For example, a list of accepted encodings may be modified to prevent a response from being encoded in an unreadable format. The modified request may then sent out to a destination web server.

According to some embodiments, if a first request happens to be an HTTPS request (e.g., it comes in on port configured for HTTPS such as, for example, port 443), the request may not be analyzed as it may have no previous context in a current session. Such a request may indicate a "start" of a sensitive web transaction. A response to an HTTPS request may not be analyzed as it may be always a part of a sensitive transaction.

On receiving a response to the HTTP request, after optionally accumulating all the chunks (in case of chunked encoding), VM Web Management Module 154 may start parsing the HTTP response. While parsing, all the URLs of type 'https://xyz' may be replaced with 'http://xyz' and original HTTPS URLs may be stored in electronic storage (e.g., in a database). One or more headers for a response page may then be updated to reflect updated content bytes, such as the content length. The response page may then be passed on to a browser such as, for example, client 165A. When client 165A sends a new request to fetch an URL, this may be checked against electronic storage (e.g., a request database that stores updated URLs). A 'match' with one of the database entries may imply that client 165A should start a negotiation with a web server to establish a secure connection for the HTTPS request. This may indicate the "start" of a sensitive web transaction.

In addition to identifying the start of the transaction, the request intercepted in the previous step may also provide information related to the session-state, which may include cookie settings, POST body, and other headers of interest. This information may be saved to later be used by a trusted browser on a trusted virtual machine.

At this point, a request may be made to the trusted browser and to ask it to send a request constructed from the information saved in the previous step—this time in the HTTPS mode—to the web server. This may be achieved by using a browser extension, an add-on, a plug-in, and/or a browser helper object (BHO), that may intercept a web request and modify it by overwriting portions of the request using the saved information. Traffic on a subsequent HTTPS connection from secure client 165B may be unmodified and may be considered sensitive.

VM Web Management Module 154 may continue to monitor for other indicators of a content that may be handled by a different virtual machine. When VM Web Management Module 154 receives a packet on a port configured for HTTP (e.g., port 80) and/or content starting with a plaintext HTTP meeting a HTTP protocol specification, this may indicate an "end" of a previous sensitive transaction. At this point, it may be transitioned back to the normal browser, restart HTTP traffic interception and URL rewriting process.

URL rewriting, as described above, may be a non-trivial process because some of the page content may be dynamically generated, such as by JavaScript. However, e-commerce sites, banking web sites, and other sites may use scripts that may contain static URL sub-strings which later may be concatenated during the interpretation phase. The URL prefix in such cases may often be concatenated with various different strings depending on user inputs to produce the complete URL string. In these cases, rewriting the URL prefix strings may be sufficient. By intervening on any HTTPS connection, any direct HTTPS requests which may be made from the browser may be caught by VM Web Management Module 154 which may tunnel all such connections including any malicious background transactions. In such cases, a BHO-based implementation (e.g., using SC module 158A) may intercept the HTTPS requests initiated by the normal browser to provide relevant context information, such as the URL. This may then be used to construct a new HTTPS request from a trusted browser (e.g., client 165B). Client 156B and VM 156B may then be transitioned to as described above. In some embodiments, HTTPS connections originating from a regular non-trusted browser may simply be terminated by the proxy and a secure client in a locked down virtual environment (e.g., client 156B and VM 156B) may be transitioned to and a user may be prompted to reenter the HTTPS URL.

According to some embodiments, additional logic may be implemented to decide whether to block certain URLs even though they appear secure, by using URL reputation systems.

According to some embodiments, instead of a web proxy server a BHO (or browser extension) may be used instead. Because a BHO sits within the browser's address space, it can always see and/or modify the content received and sent to and from a remote web server. However, this may leave the system vulnerable to attacks from resident malware.

Although the above description refers to web browsers, it may be appreciated that other network communication capable software may also be compartmentalized using virtual machines. For example, email clients may be monitored to reduce threats from attachments, phishing attacks, etc. In such an example, an attachment or an email containing embedded URLs may be opened in a test virtual environment to reduce a threat from malware. An email message containing certain content (e.g., requests for information or containing sensitive information) or from a certain domain may be transitioned to a secure virtual environment. In another example, application software that is network enabled (e.g., permits sharing or updates via the Internet) may be monitored. If such application software is to be updated, it may be first updated in a test virtual environment (e.g., a virtual machine designed to host unknown application updates) to minimize a threat from malware or to reduce a risk of a buggy patch or update. According to some embodiments, client software may not be monitored but a user may be provided with an interface control to switch among virtual environments. For example, a user may be provided with buttons, tabs, or other controls to switch between virtual environments for a particular application. In such an embodiment, a user may use such controls if they feel an application is about to perform a communication sending or receiving sensitive information, executing or receiving unknown content, or for other purposes. According to some embodiments, a user may be able to specify one or more indicators to cause a transition between different virtual environments (e.g., if content containing these keywords is detected transition to a secure environment). Other user specified indicators may include a list of acceptable domains or network addresses for a normal environment, a list of domains or network addresses for a secure environment, a list of attachment types or content for a test environment (e.g., scripts or active content), and a list of ports or message types for a particular environment. According to some embodiments, a user may specify and/or accept default settings for indicators and such indicators may specify allowable content and/or actions for a plurality of environments. Unknown received or transmitted content and/or network actions of client software may cause a prompt to a user interface allowing a user to specify an appropriate environment and/or action (e.g., transition to a test environment or deny download).

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, VM Web Management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
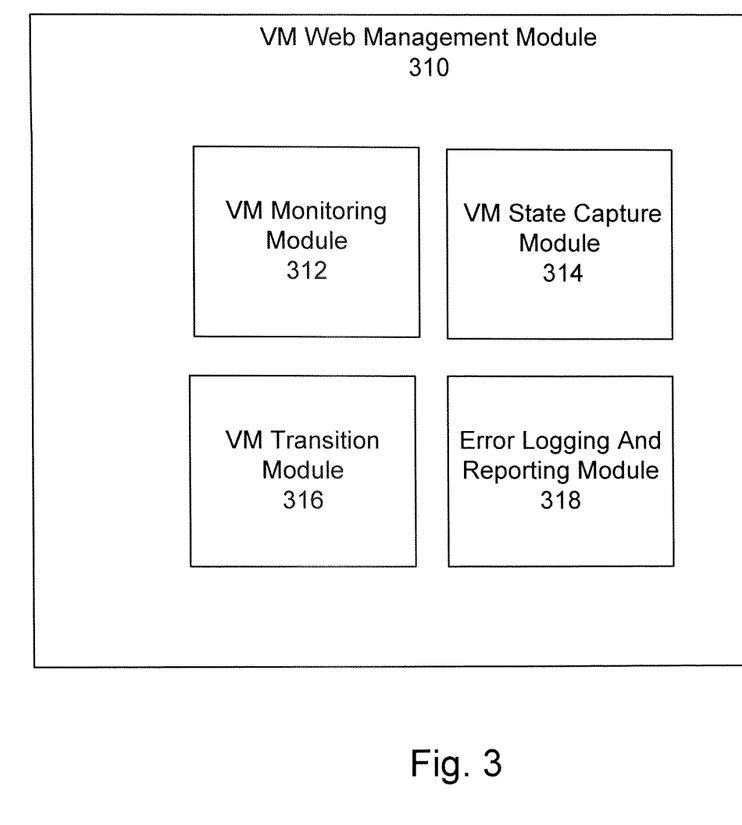
FIG. 3 shows a module for virtual environment-based web client management in accordance with an embodiment of the present disclosure.

Referring to FIG. 3, there is shown a VM Web Management Module 310 in accordance with an embodiment of the present disclosure. As illustrated, the VM Web Management module 310 may contain one or more components including VM Monitoring Module 312, VM State Capture Module 314, VM Transition Module 316, and Error logging and reporting module 318.

VM Monitoring Module 312 may capture information used for a web transaction by looking into the last request from a browser (e.g., client 165A). For example, client 165A may be requesting data from an online merchant site. Communications not requiring security may continue on client 165A (e.g., browsing an online merchant site). When security is desired (e.g., an HTTPS transaction is initiated in response to a checkout button clicked) the techniques discussed herein may be used to switch to a secure VM such as client 165B (e.g., a VM periodically rolled back to a known good state, using binary white-listing, and containing security modules). A last request may then be dropped by VM Monitoring Module 312 since all of the data may have been captured at a gateway or proxy server such as server 140A.

VM State Capture Module 314 may intercept state information at a client side. For example, if a request from client 165B is encrypted, intercepting and modifying it may be difficult. For plaintext HTTP messages, it may be easy to look into and modify a request in a proxy server. However, for HTTPS requests, browser helper objects, browser extensions, add-ons, and/or browser APIs may be used to intercept and/or modify encrypted requests. Browser helper objects, browser extensions, add-ons, and/or browser APIs may be able to see a plaintext version of encrypted messages the browser's context (e.g., in the browser memory without encryption).

VM Transition Module 316 may initiate artificial request containing all the captured information that may be created and sent from secure VM web client such as, for example, client 165B. According to some embodiments, a module, a script, or an API on VM 156B may be used to instantiate client 156B and to initiate an artificial request. According to at least one embodiment, VM Transition Module 316 may use a keyboard controller driver to transition between virtual machine interfaces. This may not require a user to do anything, and may occur without a user's knowledge or control (e.g., the transition may occur so quickly that a user may not be able to perceive the switch and a user may not be provided control over which interface window is displayed). Virtual machine monitors (VMMs), hypervisors, and/or virtualization platforms may expose multiple ways, such as keyboard shortcuts, menu tabs, and mouse clicks, that may allow a user to switch displays and the keyboard/mouse focus between two or more virtual machines. According to some embodiments, transitioning between virtual machines may be implemented by installing a keyboard filter driver on a host OS (e.g., an OS of client 110) so that the host OS can intercept these special key combinations when a VMM is in focus. Artificial keystrokes may be inserted in the software (keyboard controller driver) to switch focus from one VM to the other VM. A similar mechanism may be used to implement VM switching for different VMMs.

Error logging and reporting module 318 may produce logs, reports, or other information associated with virtual machine web management.

Figure 4:
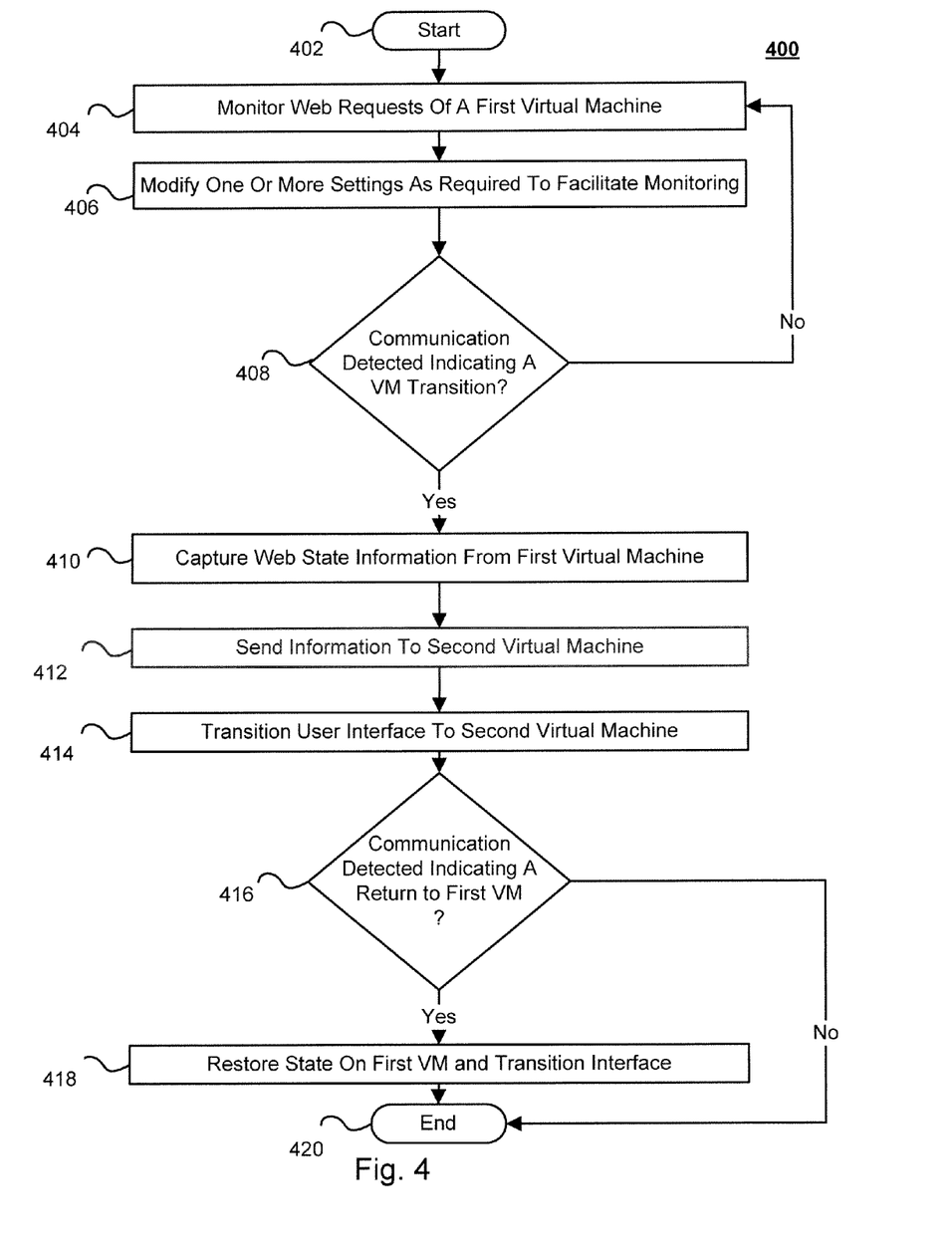
FIG. 4 depicts a method for virtual environment-based web client management in accordance with an embodiment of the present disclosure.

Referring to FIG. 4, there is depicted a method 400 for virtual environment-based web client management in accordance with an embodiment of the present disclosure. At block 402, the method 400 may begin.

At block 404, web requests of a first virtual machine may be monitored. For example, a web proxy server, a gateway, a router, or client side tool (e.g., a browser helper object, a browser plug-in, or a browser tool bar) may monitor web requests of a first virtual machine.

At block 406, one or more settings may be modified to facilitate monitoring. For example, a list of accepted encodings may be modified to ensure monitoring may be performed.

At block 408, it may be determined whether a communication indicating a need for a virtual machine transition has been detected. For example, a web request indicating a beginning of a secure transaction or a request for questionable or unknown content may be detected. If an indicator of a VM transition is detected (e.g., a request sent to a HTTPS port) or an indicator of unknown content or executables is detected (e.g., using reputation based analysis, white lists, and/or blacklists), the method may continue at block 410. If no indicator of a need to transition to a different VM is detected, the method may continue to monitor at block 404.

At block 410, web communication state information may be captured. Some state information may be captured using a proxy server, a gateway, or another network element between a sending browser and a destination web site. Some web communication state information may be captured using a client side tool such as a browser plug-in or a browser helper object. A client side tool may be capable of capturing state information even when communications between a browser and a remote web site are encrypted or otherwise secured. Captured state information may include header and/or body information from web requests, URLs, URIs, cookie values, and other settings.

At block 412, captured state information may be transitioned to a second virtual machine (e.g., vm 156B). According to some embodiments, state information may be shared (e.g., a cookie database of a first browser may be accessible to a second browser) from a browser on a non-secure virtual environment to a browser on a secure virtual environment and one or more portions of state information may not have to be transferred. According to some embodiments, state information may be shared both ways.

At block 414, a user interface may be transitioned to a second virtual machine. For example, a display of client 110 may be transitioned from an interface of client 165A to show an interface of client 165B. According to some embodiments, an API of virtualization environment 145 may be used to switch or transition a display.

A window for a first virtual machine client may be open during non-secure communications. It may be maximized and/or its size and position may be known. When a transition is made to a secure virtual machine, an interface window for the secure virtual machine may be placed on top in the same size and position and containing the same interface attributes (e.g., the underlying virtual machines may be a same OS and/or other attributes but may be configured differently for security purposes). The overlaid interface window to the secure virtual machine may contain a web client window which may be similar to a web client window open in the non-secure virtual machine (e.g., a same browser make but perhaps with more secure settings and/or security add-ons) and may contain other similar characteristics. For example, the browser window may be opened to a same size and position in the secure virtual machine interface window as the browser window in the non-secure virtual machine interface window. Differences may be focused on security aspects and may not be noticeable to a user. A destination web client may open a URL captured when a secure transaction or unknown content was detected (e.g., opened using a script in the VM running the destination browser, for example, a script on client 165B).

According to at least one embodiment, a keyboard controller driver may be used to transition between virtual machine interfaces. This may not require a user to do anything, and may occur without a user's knowledge or control (e.g., the transition may occur so quickly that a user may not be able to perceive the switch and a user may not be provided control over which interface window is displayed). Virtual machine monitors (VMMs), hypervisors, and/or virtualization platforms may expose multiple ways, such as keyboard shortcuts, menu tabs, and mouse clicks, that may allow a user to switch displays and the keyboard/mouse focus between two or more virtual machines. According to some embodiments, transitioning between virtual machines may be implemented by installing a keyboard filter driver on a host OS (e.g., an OS of client 110) so that the host OS can intercept these special key combinations when a VMM is in focus. Artificial keystrokes may be inserted in the software (keyboard controller driver) to switch focus from one VM to the other VM. A similar mechanism may be used to implement VM switching for different VMMs.

After transitioning to another virtual machine (e.g., a secure virtual machine or a playground virtual machine used for unknown content), HTTP and/or HTTPS communications may continue on the second virtual machine until an indicator is received that another transition may be made.

At block 416, it may be determined whether an indicator of a transition back to a first virtual machine or a transition to a third virtual machine has been received. For example, a packet may be received at a port configured for HTTP communications. If an indicator of a transition back to a first virtual machine is received, the method 400 may continue at block 418. If an indicator of a transition back to a first virtual machine is not received, the method 400 may end at block 420.

At block 418, a transition back to a first virtual machine may be made. A return transition may cause a web client to execute a web request (e.g., an intercepted HTTP request at client 165A) and handle responses. A user interface may be transitioned using a keyboard filter driver or a hypervisor API as described above. According to some embodiments, state information may be transferred to first virtual machine. According to some embodiments, no state information may be transferred because of security concerns.

At block 420, the method 400 may end.

Figure 5:
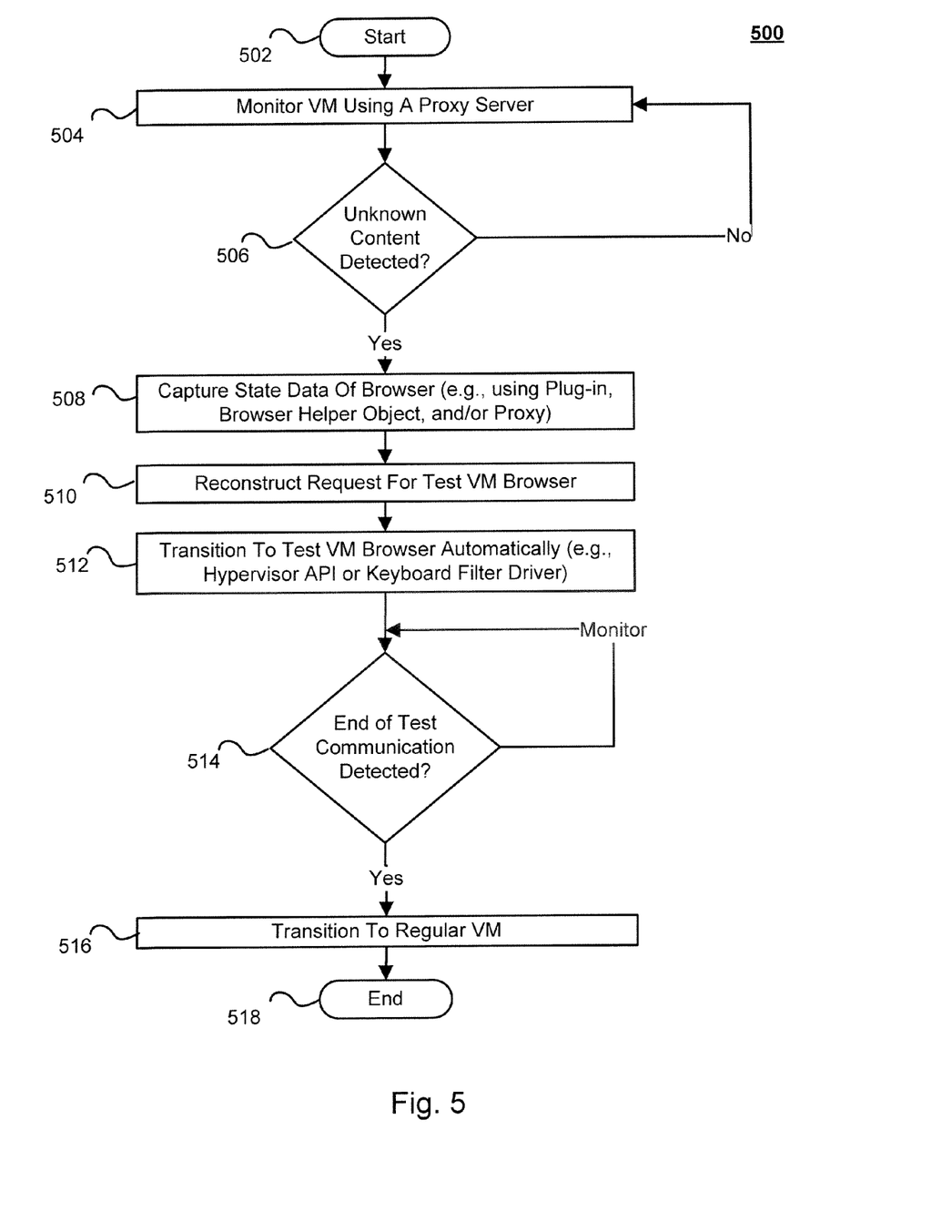
FIG. 5 depicts a method for virtual environment-based web client management in accordance with an embodiment of the present disclosure.

Referring to FIG. 5, there is depicted a method 500 for virtual environment-based web client management in accordance with an embodiment of the present disclosure. At block 502, the method 500 may begin.

At block 504, a virtual machine may be monitored using a proxy server.

At block 506, it is determined whether unknown content or questionable content is detected. For example, web requests may be scanned using white lists, blacklists, reputation based analysis, signatures, behavior based analysis, and/or other techniques. If an indicator of questionable content (e.g., an unrecognized executable) or a unknown domain is received, the method may continue at block 508. If an indicator of unknown or questionable content is not received, the method may return to monitoring at block 504.

At block 508, web state data may be captured. For example, HTTP header and Body information may be captured using a proxy or a gateway. Cookie data may be captured, URL, and/or URI data may be captured. State data captured may depend on an amount of data needed to transition a web request to a second browser on a test VM environment.

At block 510, a web request may be reconstructed for a browser on a test VM environment (e.g., client 165C on VM 156c).

At block 512, a user interface may be transitioned to a test virtual machine. For example, a display of client 110 may be transitioned from an interface of client 165A to show an interface of client 165C. According to some embodiments, an API of virtualization environment 145 may be used to switch or transition a display. Client 165C may be a client on VM 156C which may be a virtual machine containing safeguards for executing and/or downloading questionable or unknown content.

At block 514, if an end of a test transaction/communication is detected the method may continue at block 516. For example, an HTTP request may be detected indicating a return to a known and/or approved domain. If an end of a test transaction/communication is not detected, the method may continue to monitor at block 514.

At block 516, a transition may be made back to a first virtual machine.

At block 518, the method 500 may end.

At this point it should be noted that virtual environment-based web client management in accordance with the present disclosure as described above typically involves the processing of input data and the generation of output data to some extent. This input data processing and output data generation may be implemented in hardware or software. For example, specific electronic components may be employed in an virtual environment-based web client management module or similar or related circuitry for implementing the functions associated with virtual environment-based web client management in accordance with the present disclosure as described above. Alternatively, one or more processors operating in accordance with instructions may implement the functions associated with virtual environment-based web client management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for virtual environment-based web client management comprising:
   monitoring web requests of a first web client of a first virtual machine;
   detecting a web request from the first web client matching one or more indicators, the one or more indicators corresponding to content to be handled on a second virtual machine, wherein unrecognized network actions of the first web client cause a prompt to a user interface allowing a user to specify a destination virtual machine environment;
   capturing a state of the first web client on the first virtual machine, wherein capturing a state of the first web client allows capture of HTTPS transaction information for transitioning to a secure virtual machine;
   transferring captured state information and web request information to a second web client on the second virtual machine; and
   transitioning a user interface from the first web client to the second web client automatically using at least one of a keyboard controller driver and a hypervisor API, the second web client handling the web request from the first web client.

2. The method of claim 1, wherein capturing a state of the first web client on the first virtual machine comprises using an API of the first web client to capture state information.

3. The method of claim 2, wherein the using an API of the first web client comprises using at least one of a browser helper-object and a browser plug-in.

4. The method of claim 1, wherein capturing a state of the first web client on the first virtual machine comprises using a proxy server to capture a state of the first web client.

5. The method of claim 1, wherein the one or more indicators corresponding to content to be handled on a second virtual machine comprise indicators of a secure HTTPS transaction.

6. The method of claim 5, wherein the one or more indicators comprise at least one of: a URL beginning with HTTPS; and traffic destined for port 443.

7. The method of claim 5 wherein the second virtual machine comprises a secure virtual machine.

8. The method of claim 2, wherein the API of the first web client allows detection of the resumption of normal web browsing after a secure HTTPS based transaction is complete.

9. The method of claim 1, wherein the one or more indicators corresponding to content to be handled on a second virtual machine comprise indicators of a request to execute unknown content, a request for content from an unapproved domain; and a request for content from a questionable domain.

10. The method of claim 1, wherein the second virtual machine comprises a virtual machine for testing unapproved content.

11. The method of claim 1, wherein transferring captured state information and web request information to a second web client on a second virtual machine comprises at least one of a cookie and a request header.

12. The method of claim 1, wherein a browser helper object is used to rewrite a request from the second web client using the transferred captured state information.

13. The method of claim 1, wherein a script in the second virtual machine is used to instantiate the second web client.

14. The method of claim 1, wherein at least a portion of state information used by the first web client is stored in electronic storage accessible to the second web client reducing a need to transfer state information.

15. The method of claim 1, wherein transitioning a user interface from the first web client to the second web client automatically using at least one of a keyboard controller driver and a hypervisor API, comprises switching a user interface in a manner such that the second web client is presented in a manner similar to the first web client such that a transition to the second web client handling the web request from the first web client does not disrupt a user of the first web client and the second web client.

16. The method of claim 5, wherein an indicator is received indicating the end of a secure transaction.

17. The method of claim 16, wherein the indicator of the end of the secure transaction comprises at least one of: receipt of a packet sent to port 80 and content starting with a plaintext HTTP meeting a HTTP protocol specification.

18. At least one non-transitory processor readable storage medium for storing a computer program of instructions configured to be readable by at least one processor for instructing the at least one processor to execute a computer process for performing the method as recited in claim 1.

19. An article of manufacture for virtual machine web management, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
      monitor web requests of a first web client of a first virtual machine;
      detect a web request from the first web client matching one or more indicators, the one or more indicators corresponding to content to be handled on a second virtual machine, wherein unrecognized network actions of the first web client cause a prompt to a user interface allowing a user to specify a destination virtual machine environment;
      capture a state of the first web client on the first virtual machine, wherein capturing a state of the first web client allows capture of HTTPS transaction information for transitioning to a secure virtual machine;
      transfer captured state information and web request information to a second web client on the second virtual machine; and
      transition a user interface from the first web client to the second web client automatically using at least one of a keyboard controller driver and a hypervisor API, the second web client handling the web request from the first web client.

20. A system for virtual environment-based web client management comprising:
   one or more processors communicatively coupled to a network; wherein the one or more processors are configured to:
      monitor web requests of a first web client of a first virtual machine;

detect a web request from the first web client matching one or more indicators, the one or more indicators corresponding to content to be handled on a second virtual machine, wherein unrecognized network actions of the first web client cause a prompt to a user interface allowing a user to specify a destination virtual machine environment;

capture a state of the first web client on the first virtual machine, wherein capturing a state of the first web client allows capture of HTTPS transaction information for transitioning to a secure virtual machine;

transfer captured state information and web request information to a second web client on the second virtual machine; and transition a user interface from the first web client to the second web client automatically using at least one of a keyboard controller driver and a hypervisor API, the second web client handling the web request from the first web client.

* * * * *